US012566154B2

(12) United States Patent
Liu et al.

(10) Patent No.: US 12,566,154 B2
(45) Date of Patent: Mar. 3, 2026

(54) PURIFICATION SYSTEM FOR NITROGEN GAS AND XENON GAS IN WATER AND ISOTOPE STATIC ANALYSIS METHOD THEREOF

(71) Applicant: INSTITUTE OF GEOLOGY AND GEOPHYSICS, CHINESE ACADEMY OF SCIENCES, Beijing (CN)

(72) Inventors: Ziheng Liu, Beijing (CN); Jiannan Li, Beijing (CN); Fei Su, Beijing (CN); Huaiyu He, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 1106 days.

(21) Appl. No.: 17/559,882

(22) Filed: Dec. 22, 2021

(65) Prior Publication Data

US 2023/0068184 A1      Mar. 2, 2023

(30) Foreign Application Priority Data

Aug. 27, 2021    (CN) .......................... 202110994113.8

(51) Int. Cl.
| | |
|---|---|
| *G01N 27/623* | (2021.01) |
| *B01D 8/00* | (2006.01) |
| *F25J 3/08* | (2006.01) |
| *G01N 1/40* | (2006.01) |
| *G01N 1/42* | (2006.01) |

(52) U.S. Cl.
CPC ............. *G01N 27/623* (2021.01); *B01D 8/00* (2013.01); *F25J 3/08* (2013.01); *G01N 1/4077* (2013.01); *G01N 1/42* (2013.01); *G01N 2001/4088* (2013.01)

(58) Field of Classification Search
CPC ...... G01N 27/623; G01N 1/4077; G01N 1/42; G01N 2001/4088; B01D 8/00; F25J 3/08
See application file for complete search history.

(56) References Cited

FOREIGN PATENT DOCUMENTS

CN          107063784 A   *   8/2017   ............... G01N 1/28

* cited by examiner

*Primary Examiner* — Jill A Warden
*Assistant Examiner* — Alex Ramirez
(74) *Attorney, Agent, or Firm* — DLA Piper LLP (US)

(57) ABSTRACT

A purification system for nitrogen gas and xenon gas in water and a static isotopic analysis method thereof are provided. The system includes a sample container, a carbon dioxide ice cold trap, a gas delivery main pipe and a mass spectrometer for noble gas communicated sequentially. The gas delivery main pipe is provided with branch pipelines communicated with a cryo pump and a vacuum pump set respectively, the mass spectrometer for noble gas is communicated with the vacuum pump set, and the cryo pump adsorbs or releases nitrogen gas and/or xenon gas by setting different temperatures of the cryo pump. Inlet and outlet sides of the carbon dioxide ice cold trap are respectively provided with a first valve and a second valve. Fourth and fifth valves are respectively disposed between the gas delivery main pipe and the vacuum pump set, and between the gas delivery main pipe and the cryo pump.

6 Claims, 1 Drawing Sheet

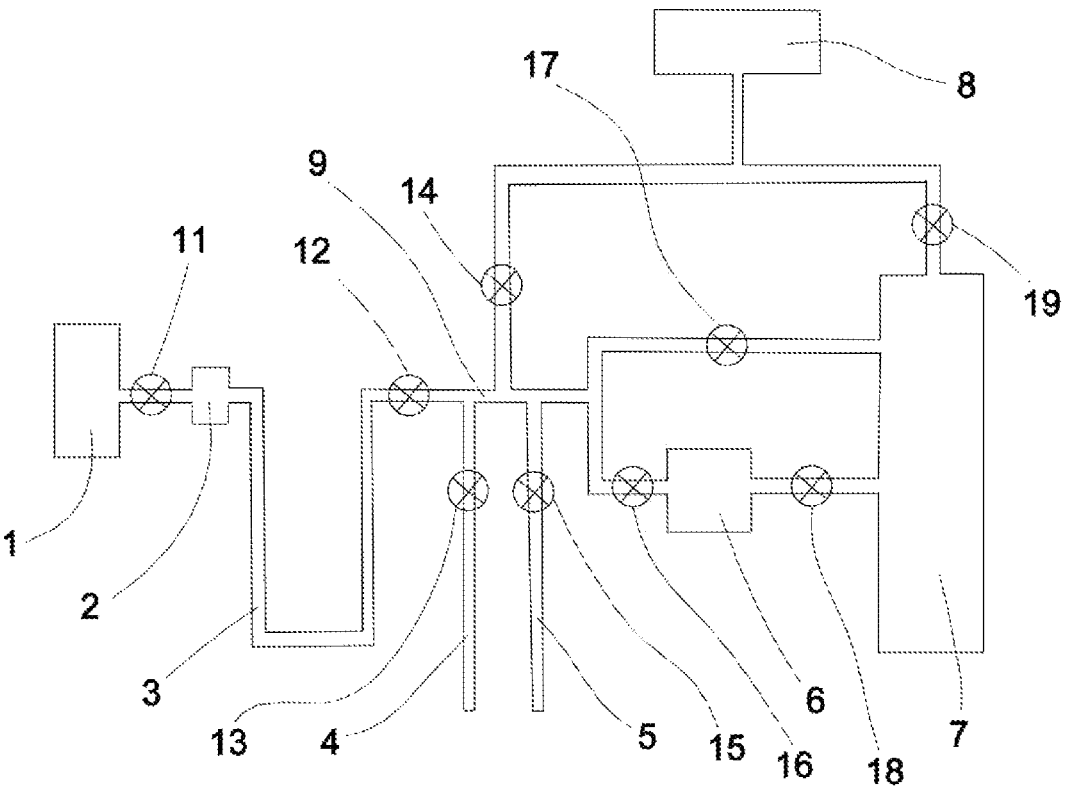

PURIFICATION SYSTEM FOR NITROGEN GAS AND XENON GAS IN WATER AND ISOTOPE STATIC ANALYSIS METHOD THEREOF

CROSS REFERENCE TO RELATED APPLICATION

This patent application claims the benefit and priority of Chinese Patent Application No. 202110994113.8 filed on Aug. 27, 2021, the disclosure of which is incorporated by reference herein in its entirety as part of the present application.

TECHNICAL FIELD

The present disclosure relates to the technical field of measurement of isotope in water, and in particular relates to a purification system for nitrogen gas and xenon gas in water and an isotope static analysis method thereof.

BACKGROUND ART

The temperature of paleo-ocean can be obtained by measuring nitrogen and xenon isotopes of ice cores. However, the ice cores are generally turns into water under test conditions. Therefore, it is necessary to measure the nitrogen and xenon isotopes in the water to calculate the temperature of the paleo-ocean and further find out the global climate change process.

According to a current method for analyzing nitrogen and xenon isotopes in water, nitrogen and xenon in gas phases are extracted by using negative pressure, and then the nitrogen and xenon in gas phases are divided into two parts to obtain respective isotopes by using dynamic mass spectrometry measurement method. This method needs to divide a sample to be measured into two parts, and measures one isotope (nitrogen or xenon) in each part. Moreover, since there is no complicated purification process performed on the sample, dynamic measurement is required. And, in order to ensure the accuracy of measurement results, there is great demand for sample volume. Therefore, the utilization rate of the sample in the prior art is not high. In addition, the ice cores are generally collected in polar regions or mountains at higher altitudes, so, the samples are very precious. Therefore, that reducing the sample consumption is very important.

As for a sample analysis method in the prior art, a water sample that is sealed by the valve is connected into a system first (the sample mass is 700-1200 g). The system is pumped thoroughly (not less than $1*10^{-7}$ Pa) by using a vacuum pump set consisting of a mechanical pump, a molecular pump, and an ion pump, and then the water sample passes through two cold traps at a time. One cold trap has a temperature of −196° C. (an outside of the cold trap is surrounded by liquid nitrogen) to adsorb the gas released from the water, and the other cold trap has a temperature of −100° C. to adsorb the residual water in the gas, so that a dry gas sample can be obtained. Then the gas is divided into two parts. One part is directly used for measurement of the nitrogen isotope, and the other part is used for measurement of the Xe isotope after the active gas is adsorbed by a getter. The measurement method adopts a mass spectrometer for stable isotope to perform the dynamic measurement.

The Chinese Patent Application CN 112629984 A discloses an isotope sample purification system and a method and application thereof. The purification system includes a sample feeding unit, a VOC trap, an adsorption trap group, a liquid nitrogen cold trap, a liquid nitrogen enrichment trap, a chromatographic column, a purification and re-enrichment trap and a sample collection pipe that are sequentially communicated through pipelines. A sample is introduced through the sample feeding unit. A gas sample enters the VOC trap in turn to remove water and VOC components. The sample in the liquid nitrogen enrichment trap is sent to the chromatographic column GC by a carrier gas introduced into a second carrier gas supply pipeline, and is separated in the chromatographic column GC according to different retention time. This solution can effectively remove the impurity gas in the isotope sample to enter a next step of mass spectrometry analysis. However, this solution can only obtain one isotope sample and perform mass spectrometry on the isotope sample, and does not give a method for measuring two isotopes sequentially in a same sample.

The Chinese Patent Application CN 107063784 A discloses an extraction and purification system for xenon gas dissolved in water and an extraction and purification method thereof. The system includes a water sample release and dissolved gas extraction system, and a gas purification and separation system communicated with the water sample release and dissolved gas extraction system. The specific steps are as follows: baking, vacuumizing and degassing the entire system; releasing a water sample and extracting gas; transferring the gas to a glass cold trap; transferring the gas to the purification system; further drying the separated gas; adsorbing and removing active gas; and separating xenon gas. Although this Chinese Patent Application can solve the problems of incomplete removal of water vapor and incomplete separation of xenon gas in the process of xenon gas extraction and separation, it is only for the separation of xenon gas. So, as for this Chinese Patent Application, there is no disclosure or record of the technical solution for obtaining nitrogen gas and xenon gas sequentially in the same sample.

SUMMARY

The present disclosure is directed to provide a purification system for nitrogen gas and xenon gas in water and an isotope static analysis method thereof to solve the problems above in the prior art. A cryo pump is disposed in the system, and different temperatures of the cryo pump are set to adsorb or release nitrogen gas and/or xenon gas, valves at different positions in the system are used to control the vacuum state and the flow directions of nitrogen gas and xenon gas to achieve static isotopic analysis of the nitrogen gas and xenon gas sequentially in a same sample, which can reduce the sample consumption while ensuring the measurement accuracy.

In order to achieve the foregoing objective, the present disclosure provides the following technical solution.

The present disclosure provides a purification system for nitrogen gas and xenon gas in water, including a sample container, a carbon dioxide ice cold trap, a gas delivery main pipe and a mass spectrometer for noble gas that are communicated with the sample container sequentially, wherein the gas delivery main pipe is provided with branch pipelines that are communicated with a cryo pump and a vacuum pump set respectively, the mass spectrometer for noble gas is communicated with the vacuum pump set, and the cryo pump is configured to be set at different temperatures to adsorb or release the nitrogen gas and/or the xenon gas; and an inlet side and an outlet side of the carbon dioxide ice cold trap are respectively provided with a first valve and a second valve, a fourth valve is disposed between the gas delivery main pipe and the vacuum pump set, a fifth valve is disposed between the gas delivery main pipe and the cryo pump, a seventh valve is disposed between the gas delivery main pipe and the mass spectrometer for noble gas, and a ninth valve is disposed between the mass spectrometer for noble gas and the vacuum pump set.

Preferably, a molecular sieve for filtering water molecules is disposed between the first valve and the carbon dioxide ice cold trap.

Preferably, another branch pipeline is disposed on the gas delivery main pipe to communicate with a CuO furnace, and a third valve is disposed between the CuO furnace and the gas delivery main pipe.

Preferably, a gas delivery branch pipe is disposed between the gas delivery main pipe and the mass spectrometer for noble gas, the gas delivery branch pipe comprises a nitrogen gas delivery branch pipe and a xenon gas delivery branch pipe that are disposed in parallel, the seventh valve is disposed on the nitrogen gas delivery branch pipe, and a sixth valve is disposed on the xenon gas delivery branch pipe.

Preferably, an adsorbent container and an eighth valve are disposed sequentially in a direction close to the mass spectrometer for noble gas on the xenon gas delivery branch pipe between the sixth valve and the mass spectrometer for noble gas.

Further provided is an isotope static analysis method, including the following steps: vacuumizing the purification system; introducing a sample gas into the purification system, removing water molecules which are impurity, and adsorbing the nitrogen gas and the xenon gas; extracting impurity gas with a low boiling point in the purification system; increasing a temperature of the adsorption device to enable the temperature to be between a boiling point of the nitrogen gas and a boiling point of the xenon gas, releasing the nitrogen gas, and introducing the nitrogen gas into the mass spectrometer for noble gas for measurement of the nitrogen gas; and increasing continuously the temperature of the adsorption device to enable the temperature is higher than the boiling point of the xenon gas, releasing the xenon gas, and introducing the xenon gas into the mass spectrometer for noble gas for measurement of the xenon gas.

Preferably, after releasing the nitrogen gas and before the measurement of the nitrogen gas, removing reducing gas comprising CO and CH4 by the CuO furnace.

Preferably, after completing the measurement of the nitrogen gas, extracting the nitrogen gas measured by the vacuum pump set.

Preferably, before the measurement of the xenon gas, adsorbing active gas by an adsorbent of the purification system.

Preferably, when removing the impurity water molecules, water molecules are filtered by using a molecular sieve, and water molecules passing through the molecular sieve are adsorbed by using a carbon dioxide ice cold trap.

Compared with the prior art, some embodiments has achieved the following technical effects.

(1) The system is provided with the cryo pump, and different temperatures of the cryo pump are set to adsorb or release nitrogen gas and/or xenon gas, valves at different positions in the system are used to control the vacuum state and the flow directions of nitrogen gas and xenon gas to achieve static isotopic analysis of the nitrogen gas and xenon gas sequentially in a same sample, which can reduce the sample consumption while ensuring the measurement accuracy.

(2) Before being introduced into the carbon dioxide ice cold trap, the sample of the present disclosure passes through the molecular sieve to filter water molecules, which can further remove the water molecules in the sample. Thus, the influence of water molecules on the measurement result is reduced, and the accuracy of the measurement result is further improved.

(3) The present disclosure can remove reducing gases such as CO and $CH_4$ by providing the CuO furnace. So, on the one hand, the abundance of the measured gas is increased, and on the other hand, the interference of CO on the measurement of $N_2$ at a same peak position is reduced. In a process in which CuO participates in the reaction, water vapor and $CO_2$ gas will be produced, and the water vapor and the $CO_2$ gas can be absorbed by the cryo pump.

(4) According to the present disclosure, an adsorbent is also arranged on the pipeline through which the xenon gas leads to the mass spectrometer for noble gas, and the active gas therein can be absorbed by the adsorbent, so as to improve the accuracy of detection.

BRIEF DESCRIPTION OF THE DRAWINGS

In order to more clearly illustrate technical solutions in the embodiments of the present application or in the prior art, a brief introduction to the accompanying drawings required for the embodiment will be provided below. Obviously, the accompanying drawings in the following description are only some of the embodiments of the present disclosure. Those of ordinary skill in the art would also be able to derive other drawings from these drawings without making creative efforts.

FIG. 1 is a schematic structural diagram of a system of the present disclosure.

In the drawings: 1 sample container; 2 molecular sieve; 3 carbon dioxide ice cold trap; 4 CuO furnace; 5 cryo pump; 6 adsorbent container; 7 mass spectrometer for noble gas; 8 vacuum pump set; 9 gas delivery main pipe; 11 first valve; 12 second valve; 13 third valve; 14 fourth valve; 15 fifth valve; 16 sixth valve; 17 seventh valve; 18 eighth valve; and 19 ninth valve.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present invention, all other embodiments obtained by those of ordinary skill in the art without creative work shall fall within the protection scope of the present invention.

The present disclosure is directed to provide a purification system for nitrogen gas and xenon gas in water and an isotope static analysis method thereof to solve the problems in the prior art. A cryo pump is disposed in the system, and different temperatures of the cryo pump are set to adsorb or release the nitrogen gas and/or xenon gas, valves at different positions in the system are used to control the vacuum state and the flow directions of nitrogen gas and xenon gas to achieve static isotopic analysis of the nitrogen gas and xenon gas sequentially in a same sample, which can reduce the sample consumption while ensuring the measurement accuracy.

In order to make the objectives, features, and advantages mentioned above of the present disclosure more apparent and easily understood, the present disclosure will be further described in detail below with reference to the drawings and particular implementations.

As shown in FIG. 1, the present disclosure provides a purification system for nitrogen gas and xenon gas in water, including a sample container 1, a carbon dioxide ice cold trap 3, a gas delivery main pipe 9 and a mass spectrometer for noble gas 7 that are communicated with the sample container 1 sequentially. The assemblies communicated with each other are reliably sealed to avoid gas leakage or gas as impurity entering the system. The sample container 1 is a container for containing a sample to be detected, which can release a gas as a sample. The carbon dioxide ice cold trap 3 may be a U-shaped pipe with carbon dioxide ice. The U-shaped pipe with carbon dioxide ice is made of stainless steel, with a retainer cup arranged outside. Carbon dioxide ice can be added into the retainer cup to reduce the internal temperature of the U-shaped pipe to −56.6° C., so that water vapor molecules in the gas as a sample can be adsorbed. The gas delivery main pipe 9 is a section of connecting pipeline which is provided with a plurality of three-way ports for communicating with apparatuses such as the cryo pump 5 and the vacuum pump set 8. The three-way port may be provided with branch pipelines, and communicated with the cryo pump 5 and the vacuum pump set 8 through the branch pipelines respectively. The vacuum pump set 8 may include a dry pump, a molecular pump, an ion pumps, and the like, which can pump to reach a certain degree of vacuum (generally not less than $1*10^{-7}$ Pa). The specific vacuumizing process is a conventional technical mean in the art, and the descriptions thereof are omitted here. The mass spectrometer for noble gas 7 can use the Helix MC Plus produced by Thermo Fisher Scientific. The mass spectrometer for noble gas 7 can perform static analysis on the noble gas. The mass spectrometer for noble gas 7 is also communicated with the vacuum pump set 8, and the system can be vacuumized via the vacuum pump set 8. The cryo pump 5 absorbs or releases the nitrogen gas and/or xenon gas by setting different temperatures of the cryo pump 5. Specifically, the cryo pump 5 can use a low temperature to condense the gas, and then heat the gas to release it. The model of the cryo pump 5 may be JANIS CCS-TRAP-HT/204. The cryo pump 5 can be connected to a fifth valve 15 via a CF16 stainless steel knife-edge flange.

An inlet side and an outlet side of the carbon dioxide ice cold trap 3 are respectively provided with a first valve 11 and a second valve 12. The first valve 11 and the second valve 12 are configured to control the communication between the carbon dioxide ice cold trap 3 and the sample container 1, and to control water molecules adsorbed in the carbon dioxide ice cold trap 3 to circulate to a subsequent gas separation and measurement stage, and may be manual valves or electric valves. The valves mentioned below may be valves the same as or different from the first valve 11 and the second valve 12, but all mounted on pipelines to control the on-off of the pipelines. A fourth valve 14 is disposed between the gas delivery main pipe 9 and the vacuum pump set 8, and the fifth valve 15 is disposed between the gas delivery main pipe 9 and the cryo pump 5. The fourth valve 14 can control the communication between the vacuum pump set 8 and the gas delivery main pipe 9 to control whether to vacuumize the gas delivery main pipe 9. The fifth valve 15 can control the in and out of adsorbed gas in the cryo pump 5. A seventh valve 17 is disposed between the gas delivery main pipe 9 and the mass spectrometer for noble gas 7. The seventh valve 17 is configured to control whether to introduce the gas into the mass spectrometer for noble gas 7 for static analysis. A ninth valve 19 is disposed between the mass spectrometer for noble gas 7 and the vacuum pump set 8. The ninth valve 19 can control whether to vacuumize the mass spectrometer for noble gas 7.

A molecular sieve 2 for filtering water molecules is disposed between the first valve 11 and the carbon dioxide ice cold trap 3. Before being introduced into the carbon dioxide ice cold trap 3, the sample passes through the molecular sieve 2 to filter water molecules, which can further remove the water molecules in the sample. So, the influence of the water molecules on the measurement result is reduced, and the accuracy of the measurement result is further improved.

The gas delivery main pipe 9 may also be provided with a branch pipeline to communicate with a CuO furnace 4. A third valve 13 is disposed between the CuO furnace 4 and the gas delivery main pipe 9. The third valve 13 can control the gas to be fed in and discharged out of the CuO furnace 4. The CuO furnace 4 is made of a quartz tube and connected to the third valve 13 through a knife-edge flange. The quartz tube is internally provided with 1-5 g of CuO powder in advance. A muffle furnace surrounding the quartz tube is outside the quartz tube. The muffle furnace can heat and control the temperature, with a heating range of 30-500° C. When the gas sample was fed in, the temperature of CuO is controlled to 250° C. and kept for 20 minutes, which can remove reducing gases such as CO and $CH_4$. On the one hand, the abundance of the measured gas is increased, and on the other hand, the interference of CO on the measurement of $N_2$ at a same peak position is reduced. At the same time, the water vapor and carbon dioxide gas generated by a reaction in the CuO furnace are adsorbed by the cryo pump 5.

A gas delivery branch pipe is disposed between the gas delivery main pipe 9 and the mass spectrometer for noble gas 7. The gas delivery branch pipe includes a nitrogen gas delivery branch pipe and a xenon gas delivery branch pipe disposed in parallel. The seventh valve 17 is disposed on the nitrogen gas delivery branch pipe, and the xenon gas delivery branch pipe is provided with a sixth valve 16. Delivery paths of nitrogen gas and xenon gas can be distinguished through the above-mentioned structures, and are controlled on or off through the seventh valve 17 and the sixth valve 16 respectively.

An adsorbent container 6 and an eighth valve 18 are disposed sequentially on the xenon gas delivery branch pipe between the sixth valve 16 and the mass spectrometer for noble gas 7. The adsorbent container 6 contains an adsorbent. The adsorbent can absorb the active gas passing through the adsorbent container 6 so as to improve the accuracy of subsequent detection on the xenon gas. It should be noted that the composition and ingredients of the adsorbent are common knowledge in the art, and are not regarded as the protection content of the present disclosure, and the descriptions thereof are omitted here.

As shown in FIG. 1, an isotope static analysis method is further provided, which can be implemented by using the system described above. The method includes the following steps.

The system is vacuumized. The vacuum pump set 8 can be used for vacuumizing, and the system including the mass spectrometer for noble gas 7 needs to be vacuumized when vacuumizing.

A gas as a sample is introduced into the system. Water molecules which are impurity can be removed by using the molecular sieve 2 and/or the carbon dioxide ice cold trap 3, and the nitrogen gas and xenon gas can be adsorbed by lowering the temperature of the cryo pump 5 to a certain range.

After the cryo pump 5 adsorbs the nitrogen gas and xenon gas, other gases as impurity (He gas, Ne gas, and the like) with low boiling points in the system are extracted by using the vacuum pump set 8. The low boiling points mentioned here mean that the boiling points of these gases are lower than the adsorption temperature of the nitrogen gas and xenon gas set in the cryo pump 5.

The temperature of an adsorption device is increased. The adsorption device mentioned here may be the cryo pump 5. By increasing the setting temperature of the cryo pump 5, and making the temperature to be between the boiling point of nitrogen gas and the boiling point of xenon gas, the nitrogen gas is released, and the nitrogen gas is introduced into the mass spectrometer for noble gas 7 for measurement.

After the measurement of the nitrogen gas is completed, the temperature of the adsorption device (such as the cryo pump 5) is continued to be increased to make the temperature higher than the boiling point of xenon gas, the xenon gas is released, and the xenon gas is introduced into the mass spectrometer for noble gas 7 for measurement.

Further, after releasing the nitrogen gas and before the measurement of the nitrogen gas, the reducing gases including CO and $CH_4$ can be removed by using the CuO furnace 4.

After the measurement of nitrogen gas is completed, the measured nitrogen gas can be extracted by using the vacuum pump set 8 to further improve the purity of the subsequent xenon gas.

Before the measurement of the xenon gas is completed, the active gas contained in the xenon gas can be adsorbed by using the adsorbent.

When removing water molecules, the water molecules can be filtered by using the molecular sieve 2, and water molecules passing through the molecular sieve 2 can be adsorbed by using the carbon dioxide ice cold trap 3.

The present disclosure further provides a specific embodiment.

1. System vacuumizing: before sample analysis, the first valve 11 is closed, the second valve 12, the third valve 13, the fourth valve 14, the fifth valve 15, the sixth valve 16, the seventh valve 17, the eighth valve 18, and the ninth valve 19 are opened, and the gas in the pipelines (including the gas delivery main pipe 9 and the branch pipes), the mass spectrometer for noble gas 7, the carbon dioxide ice cold trap 3, the CuO furnace 4, the cryo pump 5 and the adsorbent container 6 (all at room temperature) is pumped away (the air pressure is less than $1*10^{-7}$ Pa).

2. Removal of the water molecules: the second valve 12 is closed, the first valve 11 is opened, the gas in the water sample is allowed to diffuse freely into the carbon dioxide ice cold trap 3 through the molecular sieve 2, where the water vapor molecules that are not completely filtered are absorbed; and carbon dioxide ice is added into a retainer cup outside a U-shaped pipe of the carbon dioxide ice cold trap 3 and kept for 20 minutes.

3. Adsorption of measured gas: the temperature of the cryo pump 5 is set to −220° C., the first valve 11, the third valve 13, the fourth valve 14, the sixth valve 16 and the seventh valve 17 are closed, and the second valve 12 is opened; because the fifth valve 15 is open, all gas can diffuse into the cryo pump 5, and the temperature of the cryo pump 5 is maintained at −220° C. and kept for 10 minutes, such that the nitrogen gas and xenon gas in the gas sample can be fully absorbed.

4. Pumping away of gas as impurity: when the nitrogen gas and xenon gas are fully absorbed by the cryo pump 5, the fourth valve 14 is opened to pump away other gases (gases with lower boiling points such as He gas and Ne gas) in the pipelines by using the vacuum pump set 8.

5. Nitrogen gas purification: the second valve 12 and the fourth valve 14 are closed after 10 minutes, the third valve 13 is opened, the temperature of the cryo pump 5 is set to −125° C., and kept for 60 minutes to diffuse the adsorbed nitrogen gas into the CuO furnace 4; when the nitrogen gas is fed into the CuO furnace 4, the temperature of CuO to is controlled to 250° C. and kept for 20 minutes, so as to remove reducing gases such as CO and $CH_4$; and, at the same time, water vapor and carbon dioxide gas generated by the reaction in the CuO furnace 4 are adsorbed by the cryo pump 5.

6. Nitrogen gas measurement: after 20 minutes, the eighth valve 18 and the ninth valve 19 are closed, the seventh valve 17 is opened, the gas in the pipelines is allowed to diffuse to the mass spectrometer for noble gas 7 to measure the nitrogen gas and obtain nitrogen gas measurement results.

7. Pumping away of the measured nitrogen gas: after the nitrogen gas measurement is completed, the fourth valve 14 and the ninth valve 19 are opened, the measured nitrogen gas is pumped away by using the vacuum pump set 8, and the third valve 13 and the seventh valve 17 are closed after 10 minutes.

8. Xe gas releasing and purification: the fourth valve 14 is closed, the sixth valve 16 is opened, the temperature of the cryo pump 5 is set to 80° C., and the adsorbed Xe gas and other gases as impurity are released; and, at the same time, the active gas can be absorbed by the adsorbent. The whole process is maintained for 30 minutes.

9. Xe gas measurement: the ninth valve 19 is closed, the eighth valve 18 is opened, and the Xe gas can be measured by using the mass spectrometer for noble gas 7 to finally complete the whole measurement process.

Specific embodiments are used in this specification for illustration of the principles and implementations of the present disclosure. The description of the above embodiments is merely used to help understand the method and core concept of the present disclosure. In addition, those of ordinary skill in the art may make modifications to the specific implementations and application scope in accordance with the concept of the present disclosure. In conclusion, the content of this specification should not be construed as a limitation to the present disclosure.

What is claimed is:

1. A purification system for nitrogen gas and xenon gas in water, the purification system comprising a sample container, a carbon dioxide ice cold trap, a gas delivery main pipe and a mass spectrometer for noble gas that are communicated with the sample container sequentially, wherein the gas delivery main pipe is provided with branch pipelines that are communicated with a cryo pump and a vacuum pump set respectively, the mass spectrometer for noble gas is communicated with the vacuum pump set, and the cryo pump is configured to be set at different temperatures to adsorb or release the nitrogen gas and/or the xenon gas; and an inlet side and an outlet side of the carbon dioxide ice cold trap are respectively provided with a first valve and a second valve, a fourth valve is disposed between the gas delivery main pipe and the vacuum pump set, a fifth valve is disposed between the gas delivery main pipe and the cryo pump, a seventh valve is disposed between the gas delivery main pipe and the mass spectrometer for noble gas, and a ninth valve is disposed between the mass spectrometer for noble gas and the vacuum pump set, wherein a gas delivery branch pipe is disposed between the gas delivery main pipe and the mass spectrometer for noble gas, the gas delivery branch pipe comprises a nitrogen gas delivery branch pipe and a xenon gas delivery branch pipe that are disposed in parallel, the seventh valve is disposed on the nitrogen gas delivery branch pipe, and a sixth valve is disposed on the xenon gas delivery branch pipe.

2. The purification system for nitrogen gas and xenon gas in water according to claim 1, wherein a molecular sieve for filtering water molecules is disposed between the first valve and the carbon dioxide ice cold trap.

3. The purification system for nitrogen gas and xenon gas in water according to claim 2, wherein another branch pipeline is disposed on the gas delivery main pipe to communicate with a CuO furnace, and a third valve is disposed between the CuO furnace and the gas delivery main pipe.

4. The purification system for nitrogen gas and xenon gas in water according to claim 1, wherein an adsorbent container and an eighth valve are disposed sequentially in a direction close to the mass spectrometer for noble gas on the xenon gas delivery branch pipe between the sixth valve and the mass spectrometer for noble gas.

5. The purification system for nitrogen gas and xenon gas in water according to claim 2, wherein an adsorbent container and an eighth valve are disposed sequentially in a direction close to the mass spectrometer for noble gas on the xenon gas delivery branch pipe between the sixth valve and the mass spectrometer for noble gas.

6. The purification system for nitrogen gas and xenon gas in water according to claim 3, wherein an adsorbent container and an eighth valve are disposed sequentially in a direction close to the mass spectrometer for noble gas on the xenon gas delivery branch pipe between the sixth valve and the mass spectrometer for noble gas.

* * * * *